US012567593B2

(12) United States Patent (10) Patent No.: US 12,567,593 B2
Yoo (45) Date of Patent: Mar. 3, 2026

(54) SEPARATOR ASSEMBLY FOR FUEL CELL AND FUEL CELL STACK INCLUDING SAME

(71) Applicants: Hyundai Motor Company, Seoul (KR); Kia Corporation, Seoul (KR)

(72) Inventor: Jin Hyeok Yoo, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 631 days.

(21) Appl. No.: 18/100,333

(22) Filed: Jan. 23, 2023

(65) Prior Publication Data

US 2024/0021843 A1 Jan. 18, 2024

(30) Foreign Application Priority Data

Jul. 18, 2022 (KR) ......................... 10-2022-0088444

(51) Int. Cl.
*H01M 8/0247* (2016.01)
*H01M 8/0258* (2016.01)
*H01M 8/0267* (2016.01)
*H01M 8/0273* (2016.01)
*H01M 8/242* (2016.01)
*H01M 8/2483* (2016.01)

(52) U.S. Cl.
CPC ....... *H01M 8/0247* (2013.01); *H01M 8/0258* (2013.01); *H01M 8/0267* (2013.01); *H01M*

*8/0273* (2013.01); *H01M 8/242* (2013.01); *H01M 8/2483* (2016.02)

(58) Field of Classification Search
CPC .. H01M 8/0247; H01M 8/0273; H01M 8/242; H01M 8/0258; H01M 8/2483; H01M 8/0267
See application file for complete search history.

(56) References Cited

FOREIGN PATENT DOCUMENTS

JP 6343638 B2 6/2018
KR 10-2019-0104548 A 9/2019

*Primary Examiner* — Sarah A. Slifka
(74) *Attorney, Agent, or Firm* — Fox Rothschild LLP

(57) ABSTRACT

Provided is a separator assembly for a fuel cell and a fuel cell stack including the same that are capable of strengthening a surface pressure of a surface pressure weakening point formed between an inner airtight line and an outer airtight line. A separator assembly according to an exemplary embodiment of the present disclosure is configured such that a pair of separators are bonded together and are stacked on each other while facing each other with a sub-gasket that surrounds and supports a membrane electrode assembly therebetween, and includes a first separator, and a second separator having a cooling airtight line, an inner airtight line, and an outer airtight line, wherein at least one support forming a surface pressure is provided in a region between the inner airtight line and the outer airtight line of the second separator.

20 Claims, 14 Drawing Sheets

-PRIOR ART-

-PRIOR ART-

-PRIOR ART-

-PRIOR ART-

-PRIOR ART-

-PRIOR ART-

SEPARATOR ASSEMBLY FOR FUEL CELL AND FUEL CELL STACK INCLUDING SAME

CROSS REFERENCE TO RELATED APPLICATION

The present application claims under 35 U.S.C. § 119(a) the benefit of Korean Patent Application No. 10-2022-0088444, filed Jul. 18, 2022, the entire contents of which is incorporated herein for all purposes by this reference.

BACKGROUND OF THE DISCLOSURE

Technical Field

The present disclosure relates generally to a separator assembly for a fuel cell and a fuel cell stack including the same. More particularly, the present disclosure relates to a separator assembly for a fuel cell and a fuel cell stack including the same that are capable of strengthening a surface pressure of a surface pressure weakening point formed between an inner airtight line and an outer airtight line.

Background

A fuel cell is a type of power generator that converts chemical energy of fuel into electric energy through an electrochemical reaction in a stack. Fuel cells have a wide range of applications, including serving as industrial power generators, serving as household power generators, powering vehicles, and powering small electronic devices such as portable devices. In recent years, fuel cells have increasingly been used as high efficiency clean energy sources.

FIG. 1 is a view illustrating the configuration of a typical fuel cell stack.

As illustrated in FIG. 1, in a unit cell of the typical fuel cell stack, a membrane electrode assembly (MEA) 10 is located at the innermost portion of the cell. The MEA 10 includes a polymer electrolyte membrane (PEM) 11 allowing transport of positively charged hydrogen ions (protons) therethrough, and catalyst layers, i.e., an anode 12 and a cathode 13, applied on opposite surfaces of the PEM 11 to cause hydrogen and oxygen to react.

Furthermore, a pair of gas diffusion layers (GDLs) 20 are laminated outside of the MEA 10 where the anode 12 and the cathode 13 are located, and a separator assembly 30 having a flow field for supplying fuel and discharging water generated by reactions in the MEA 10 is located outside of the GDLs 20 with gaskets 40 interposed therebetween.

In this case, the separator assembly 30 is formed by bonding an anode separator 31 disposed on the anode 12 and a cathode separator 32 disposed on the cathode 13 that face each other.

Meanwhile, the fuel cell stack is formed by stacking a plurality of unit cells, and end plates 50 are assembled to the outermost portions of the stacked unit cells to structurally support and secure individual components described above in position.

In this case, the anode separator 31 disposed in any one unit cell is stacked so as to face the cathode separator 32 of another unit cell disposed adjacent to the unit cell.

Accordingly, in order to efficiently perform the stacking process of the unit cells and maintain the alignment of each unit cell, a unit cell is constructed using the separator assembly 30 in which the cathode separator 32 and the anode separator 31 of adjacent unit cells disposed to face each other are integrated with each other.

In this case, the anode separator 31 and the cathode separator 32 constituting the separator assembly 30 are bonded and integrated to have the substantially same shape so that manifolds thereof communicate with each other, and reaction regions thereof are disposed at the same position.

Meanwhile, in the separation assembly 30, a plurality of manifolds and a reaction region are spaces in which reactant gas or cooling water is introduced, discharged, or flows, and an airtight line for providing an airtight seal is formed along the peripheries thereof by a gasket.

In general, the airtight line is formed by injection-molding a rubber gasket 40 to a predetermined thickness on a surface of at least one of the anode separator 31 and the cathode separator 32.

For example, no gasket may be formed on the anode separator 31, while the gasket 40 may be formed in various forms on a cathode reaction surface and a cathode cooling surface of the cathode separator 32.

FIG. 2A is a view illustrating the anode separator 31 constituting the typical fuel cell stack. FIG. 2B is a view illustrating the cathode reaction surface of the cathode separator 32 constituting the typical fuel cell stack. FIG. 2C is a view illustrating the cathode cooling surface of the cathode separator 32 constituting the typical fuel cell stack.

As illustrated in FIG. 2A, the anode separator 31 constituting the typical fuel cell stack has an anode reaction region 1a formed in a central region thereof and in which a flow path for flow of hydrogen is formed, and a plurality of manifolds 1b formed at opposite sides of the anode reaction region 1a. In this case, six manifolds 1b are provided, and hydrogen, air, or cooling water is introduced or discharged through each of the manifolds 1b.

In particular, between a hydrogen inlet manifold 1b' into which hydrogen is introduced among the plurality of manifolds 1b formed in the anode separator 31 and the anode reaction region 1a, a hydrogen inlet flow path 31a for introducing hydrogen flowing through the hydrogen inlet manifold 1b' into the anode reaction region 1a is formed.

In this case, a plurality of hydrogen inlet flow paths 31a are formed through the anode separator 31 so as to protrude toward an anode reaction surface. In addition, a plurality of support protrusions 31b formed to protrude toward the anode reaction surface may be formed at positions spaced apart from the hydrogen inlet flow paths 31a by a predetermined distance. Therefore, when the fuel cell stack is stacked, a frame (hereinafter, referred to as a "sub-gasket 10'") that surrounds and supports the MEA 10 is in contact with and supported by the plurality of hydrogen inlet flow paths 31a and the plurality of support protrusions 31b that protrude from the anode separator 31.

In addition, the gasket for forming the airtight line is not formed on the anode separator 31. Meanwhile, as illustrated in FIGS. 2B and 2C, the cathode separator 32 constituting the typical fuel cell stack has a cathode reaction region 2a formed in a central region thereof and in which a flow path for flow of air is formed, and a plurality of manifolds 2b formed at opposite sides of the cathode reaction region 2a. In this case, as in the case of the anode separator 31, six manifolds 2b are provided, and hydrogen, air, or cooling water is introduced or discharged through each of the manifolds 1b.

In particular, between an air inlet manifold 2b' into which air is introduced among the plurality of manifolds 2b formed in the cathode separator 32 and the cathode reaction region 2a, an air inlet flow path 32a for introducing air flowing through the air inlet manifold 2b' into the cathode reaction region 2a is formed.

Meanwhile, various types of gaskets 40 are formed on the cathode separator 32 to maintain airtightness while forming a flow path for flow of hydrogen, air, or cooling water.

For example, as illustrated in FIG. 2B, an outer airtight line 41 surrounding the plurality of manifolds 2b and the cathode reaction region 2a and coming into contact with the anode separator 31 is formed on the cathode reaction surface of the cathode separator 32. In addition, an inner airtight line 42 securing a path for inlet of air while surrounding the cathode reaction region 2a and coming into contact with the sub-gasket 10' is formed.

In addition, as illustrated in FIG. 2C, a cooling airtight line 43 securing a path for inlet of cooling water and a path for inlet of air and coming into contact with the anode separator 31 is formed on the cathode cooling surface of the cathode separator 32.

Thus, the sub-gasket 10' is stacked between the anode separator 31 and the cathode separator 32 to constitute a unit cell.

FIG. 3 is a view illustrating the unit cell constituting the typical fuel cell stack.

As illustrated in FIG. 3, in the unit cell constituting the typical fuel cell stack, the sub-gasket 10' is stacked between the anode reaction surface of the anode separator 31 and the cathode reaction surface of the cathode separator 32. In this case, opposite surfaces of the sub-gasket 10' are disposed in the anode reaction region 1a of the anode separator 31 and the cathode reaction region 2a of the cathode separator 32, respectively.

Meanwhile, the cathode cooling surface of the cathode separator 32 is disposed to face the anode cooling surface of the anode separator 31 constituting a unit cell disposed adjacent to the unit cell.

FIG. 4 is a view illustrating a point where a surface pressure is weakened when the surface pressure is formed in the cathode separator 32 constituting the typical fuel cell stack. FIG. 5 is a sectional view illustrating a point where a surface pressure is weakened when the surface pressure is formed in the unit cell constituting the typical fuel cell stack.

As illustrated in FIGS. 4 and 5, the outer airtight line 41 and the inner airtight line 42 are separately formed on the cathode reaction surface of the cathode separator 32, and the cooling airtight line 43 is formed on the cathode cooling surface of the cathode separator 32. The outer airtight line 41 and the inner airtight line 42 and the cooling airtight line 43 are formed at similar positions, but the formation positions of the airtight line 41 and the inner airtight line 42 and the formation position of the cooling airtight line 43 do not overlap completely.

Accordingly, when the fuel cell stack is formed by stacking the plurality of unit cells, a surface pressure weakening point A where the surface pressure is weakened is generated.

In particular, at the point where the outer airtight line 41 and the inner airtight line 42 are spaced apart from each other in the vicinity of the point where the reactant gas or cooling water is introduced and discharged, for example, in the vicinity of the area between the manifolds 2b formed on the cathode separator 32, the cooling airtight line 43 is formed on the cathode cooling surface of the cathode separator 32, but both the outer airtight line 41 and the inner airtight line 42 are not formed on the cathode reaction surface. Thus, at the corresponding point of the cathode cooling surface, the surface pressure weakening point A where the airtightness is weakened is generated.

At the surface pressure weakening point A thus generated, there is a problem in that the possibility of leakage of the cooling water increases.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and an objective of the present disclosure is to provide a separator assembly for a fuel cell and a fuel cell stack including the same, in which a support or support means for strengthening a surface pressure is formed in various ways at a surface pressure weakening point formed between an inner airtight line and an outer airtight line, thereby preventing the surface pressure weakening point from occurring.

The objectives to be achieved by the present disclosure are not limited to the objectives mentioned above, and other objectives not mentioned can be clearly understood by those skilled in the art from the description of the present disclosure.

In order to achieve the above objective, according to one embodiment of the present disclosure, there is provided a separator assembly for a fuel cell, the separator assembly being configured such that a pair of separators are bonded together and are stacked on each other while facing each other with a sub-gasket that surrounds and supports a membrane electrode assembly therebetween, and the separator assembly including: a first separator having a first reaction surface formed on a first surface thereof and a first cooling surface formed on a second surface thereof, and a second separator having a second cooling surface formed on a first surface thereof so as to face the first cooling surface of the first separator and a second reaction surface formed on a second surface thereof so as to face the sub-gasket, and having a cooling airtight line formed on the second cooling surface and configured to form an airtight seal with the first separator, an inner airtight line formed on the second reaction surface and configured to form an airtight seal with the sub-gasket, and an outer airtight line formed on an outer periphery of the second reaction surface and configured to form an airtight seal, wherein at least one support configured to form a surface pressure may be provided in a region between the inner airtight line and the outer airtight line of the second separator.

The support may be formed at a position overlapping a position where the cooling airtight line is formed.

The first separator may have a first reaction region formed in a central region thereof and in which a flow path for flow of a first reactant gas is formed and a plurality of first manifolds formed at opposite sides of the first reaction region, and the second separator may have a second reaction region formed in a region thereof corresponding to the first reaction region of the first separator and in which a flow path for a second reactant gas is formed, and a plurality of second manifolds formed at opposite sides of the second reaction region so as to communicate with the plurality of first manifolds, wherein the inner airtight line may be formed on the second reaction surface so as to be in contact with the sub-gasket while surrounding the second reaction region, the outer airtight line may be formed to surround the inner airtight line and the plurality of second manifolds, and the cooling airtight line may be formed on the second cooling surface so as to surround the second reaction region and the plurality of second manifolds.

The support may be formed on a virtual line which is formed in a region between adjacent second manifolds and extends from the inner airtight line to the outer airtight line.

The support may be a connection airtight line which is formed on the second reaction surface of the second separator and connects the inner airtight line and the outer airtight line to each other.

The outer airtight line may be formed to have a height higher than a height of the inner airtight line, and the connection airtight line may be formed to have a height equal to or higher than a height of the inner airtight line and may be formed to have a height equal to or lower than a height of the outer airtight line.

The outer airtight line may be formed to have a height higher than a height of the inner airtight line, and the connection airtight line may be inclined so that a height thereof gradually increases from a point connected to the inner airtight line to a point connected to the outer airtight line.

The support may be a forming protrusion which is formed on the second separator so as to protrude toward the second reaction surface in the region between the inner airtight line and the outer airtight line.

The cooling airtight line may fill an inner space of the forming protrusion formed on the second cooling surface.

The outer airtight line may be formed to have a height higher than a height of the inner airtight line, and the forming protrusion may be formed to have a height equal to or higher than a height of the inner airtight line and may be formed to have a height equal to or lower than a height of the outer airtight line.

The sub-gasket may have an edge extending to above top of the forming protrusion.

The sub-gasket may have an edge extending to above top of the inner airtight line, and an insulating layer may be formed in an upper end region of the second cooling surface where the forming protrusion protrudes.

The insulating layer may be made of the same material as the inner airtight line or the outer airtight line.

A separate airtight line configured to provide an airtight seal may not be formed on the first separator.

According to another embodiment of the present disclosure, there is provided a fuel cell stack formed by stacking a plurality of unit cells each of which includes a membrane electrode assembly, a sub-gasket surrounding and supporting the membrane electrode assembly, a pair of gas diffusion layers, and a pair of first and second separators, wherein the first separator and the second separator of adjacent unit cells disposed to face each other may be stacked on each other, the first separator may have a first reaction surface formed on a first surface thereof and a first cooling surface formed on a second surface thereof, the second separator may have a second cooling surface formed on a first surface thereof so as to face the first cooling surface of the first separator and a second reaction surface formed on a second surface thereof so as to face the sub-gasket, and may have a cooling airtight line formed on the second cooling surface and configured to form an airtight seal with the first separator, an inner airtight line formed on the second reaction surface and configured to form an airtight seal with the sub-gasket, and an outer airtight line formed on an outer periphery of the second reaction surface and configured to form an airtight seal, and at least one support configured to form a surface pressure may be provided in a region between the inner airtight line and the outer airtight line of the second separator.

The support may be a connection airtight line which is formed on the second reaction surface of the second separator and connects the inner airtight line and the outer airtight line to each other.

The support may be a forming protrusion which is formed on the second separator so as to protrude toward the second reaction surface in the region between the inner airtight line and the outer airtight line.

The cooling airtight line may fill an inner space of the forming protrusion formed on the second cooling surface.

A separate airtight line configured to provide an airtight seal may not be formed on the first separator.

The first separator may be an anode separator, and the second separator may be a cathode separator.

According to the embodiment of the present disclosure, the support for strengthening the surface pressure is formed in various ways at a surface pressure weakening point formed between the inner airtight line and the outer airtight line. Therefore, it is possible to prevent the surface pressure weakening point from occurring and thus improve the airtight performance around the manifolds formed in the separators.

Furthermore, the connection airtight line that connects the inner airtight line and the outer airtight line to each other is formed as the support. Therefore, it is possible to more easily perform an injection molding process for the formation of the inner airtight line and the outer airtight line.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
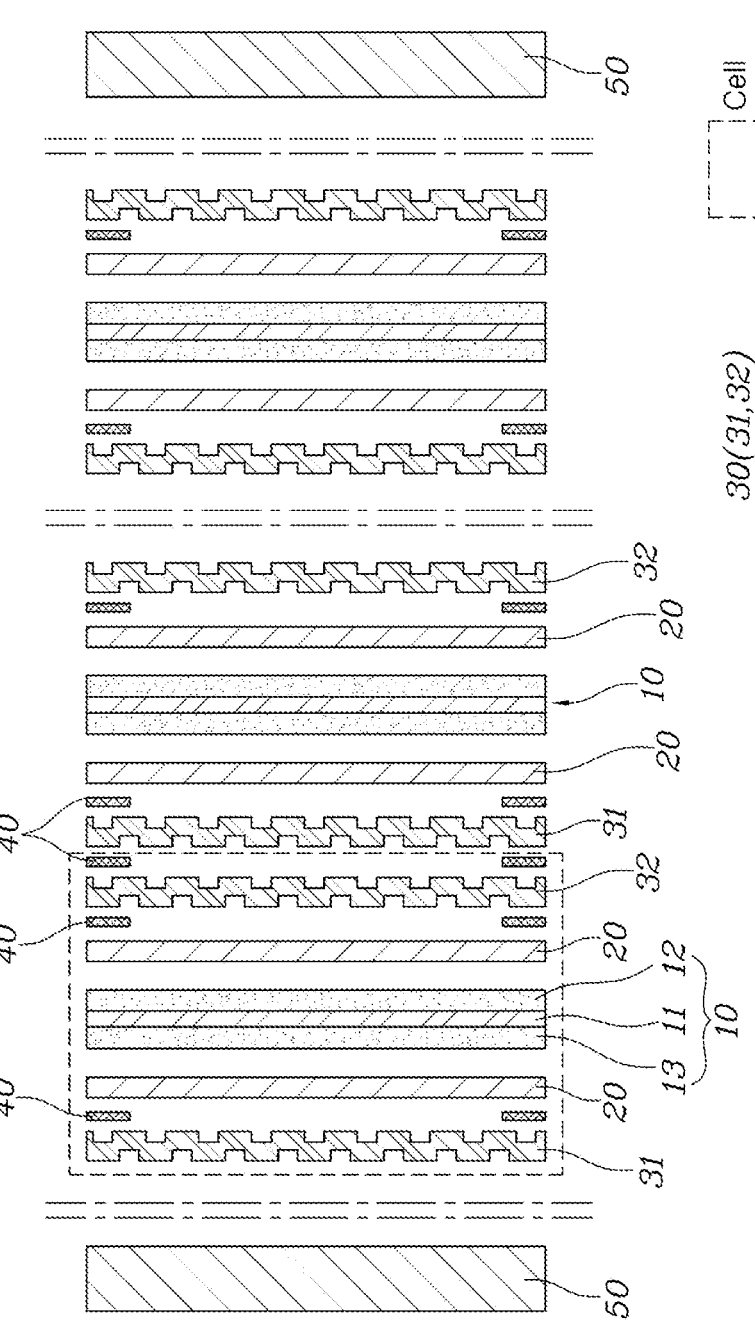
FIG. 1 is a view illustrating the configuration of a typical fuel cell stack.

Hereinafter, an exemplary embodiment disclosed in the present specification will be described in detail with reference to the accompanying drawings. Throughout the drawings, the same reference numerals will refer to the same or like parts and the description thereof will not be repeated.

In general, a suffix such as "module" and "unit" may be used to refer to elements or components. Use of such a suffix herein is merely intended to facilitate description of the specification, and the suffix itself is not intended to give any special meaning or function.

In the description of the embodiments disclosed in the present specification, it is to be noted that, when the detailed description of elements related with the present disclosure may make the gist of the present disclosure unclear, the detailed description will be omitted. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that, although the terms such as "first", "second", etc. may be used herein to describe various elements, these elements should not be limited by these terms. These terms are only used to distinguish one element from another element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

As used herein, the singular forms are intended to include the plural forms as well, unless the to context clearly indicates otherwise.

It will be further understood that the terms such as "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

In order to strengthen a surface pressure at the point where the surface pressure is weakened while maintaining the configuration of a typical fuel cell stack illustrated in FIG. 1, a fuel cell stack according to an exemplary embodiment of the present disclosure has improved the shape of an airtight line formed around the point where the surface pressure is weakened or the shape of a separator around the point where the surface pressure is weakened.

As illustrated in FIG. 1, the fuel cell stack according to the embodiment of the present disclosure has a configuration in which a membrane electrode assembly (MEA) 10, a pair of gas diffusion layers 20, and a pair of separators 100 and 200 constitute a unit cell, and a plurality of unit cells are connected in series. The pair of separators 100 and 200 will be described separately as a first separator 100 and a second separator 200. Here, the first separator 100 may be an anode separator, and the second separator 200 may be a cathode separator. Of course, the cathode separator may be used as the first separator 100, and the anode separator may be used as the second separator 200.

Meanwhile, the first separator 100 constituting one unit cell and the second separator 200 constituting another unit cell adjacent to the unit cell are disposed to face each other. In this embodiment, the first separator 100 and the second separator 200 facing each other are stacked on each other to form a separator assembly. In this case, a frame (hereinafter, referred to as a "sub-gasket 10") is provided around the MEA 10 to surround and support the MEA 10.

Therefore, in the following description, overlapping descriptions of the typical fuel cell stack and the unit cell will be omitted.

Figure 6A:
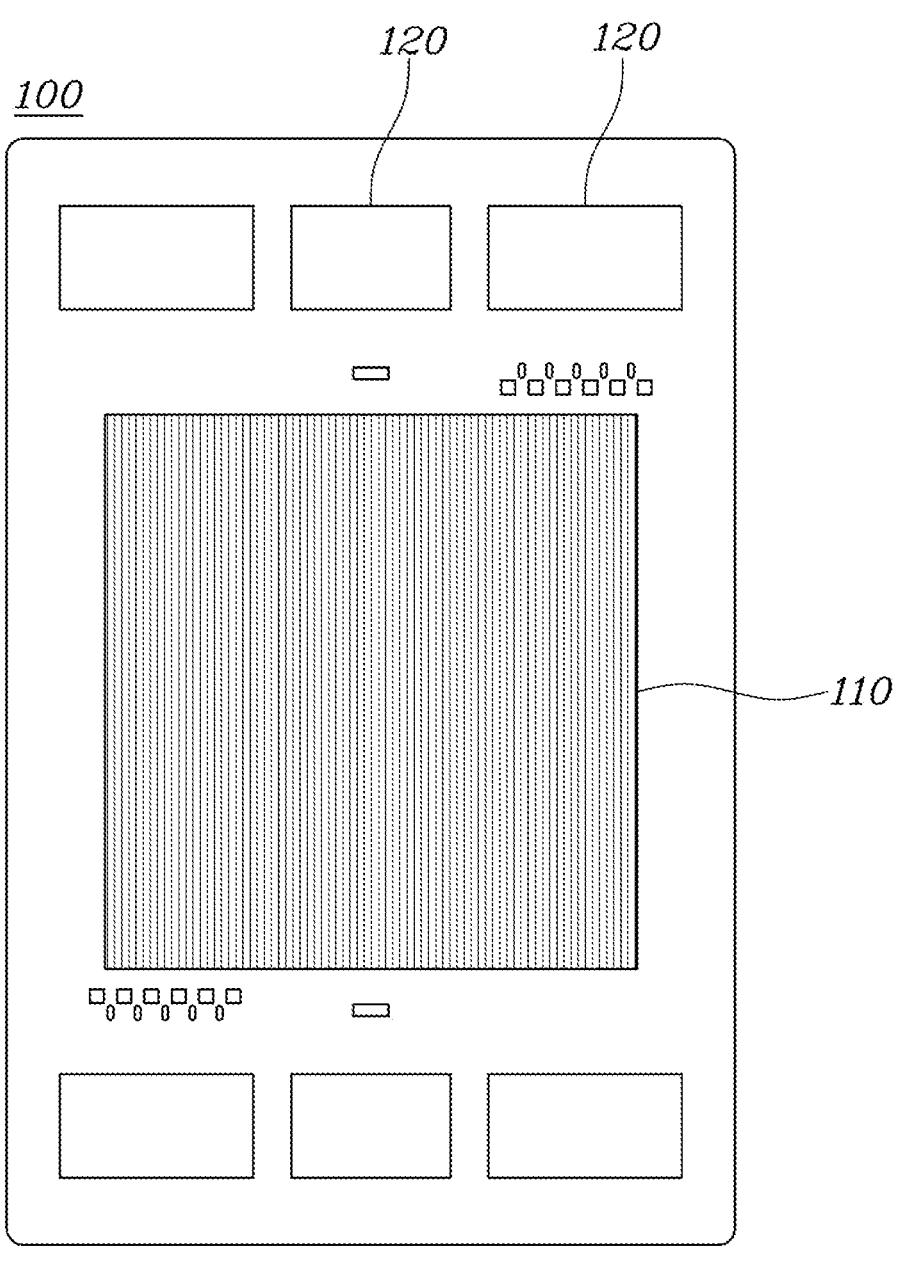
FIG. 6A is a view illustrating a first separator constituting a separator assembly for a fuel cell according to an exemplary embodiment of the present disclosure.
Figure 6B:
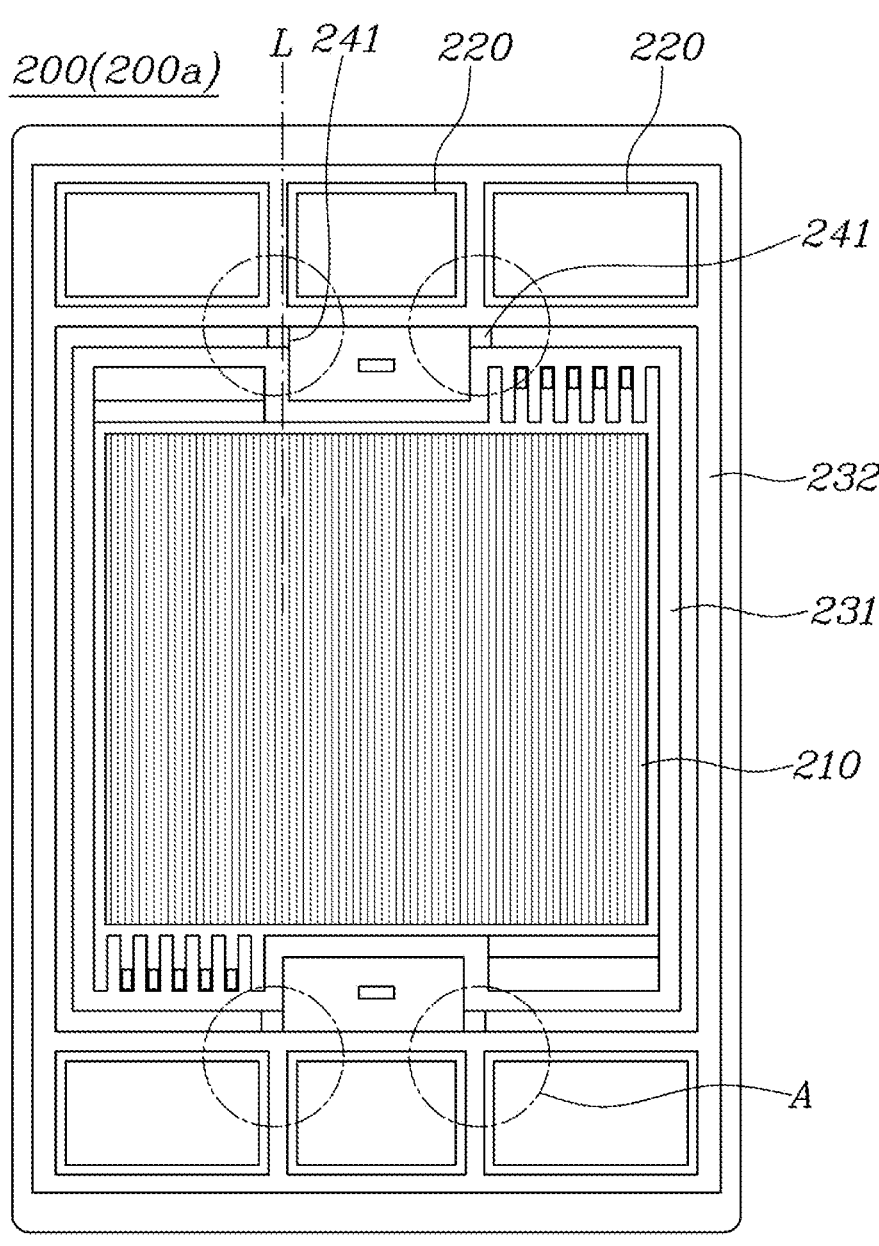
FIG. 6B is a view illustrating a second reaction surface of a second separator constituting the separator assembly for the fuel cell according to the embodiment of the present disclosure.
Figure 6C:
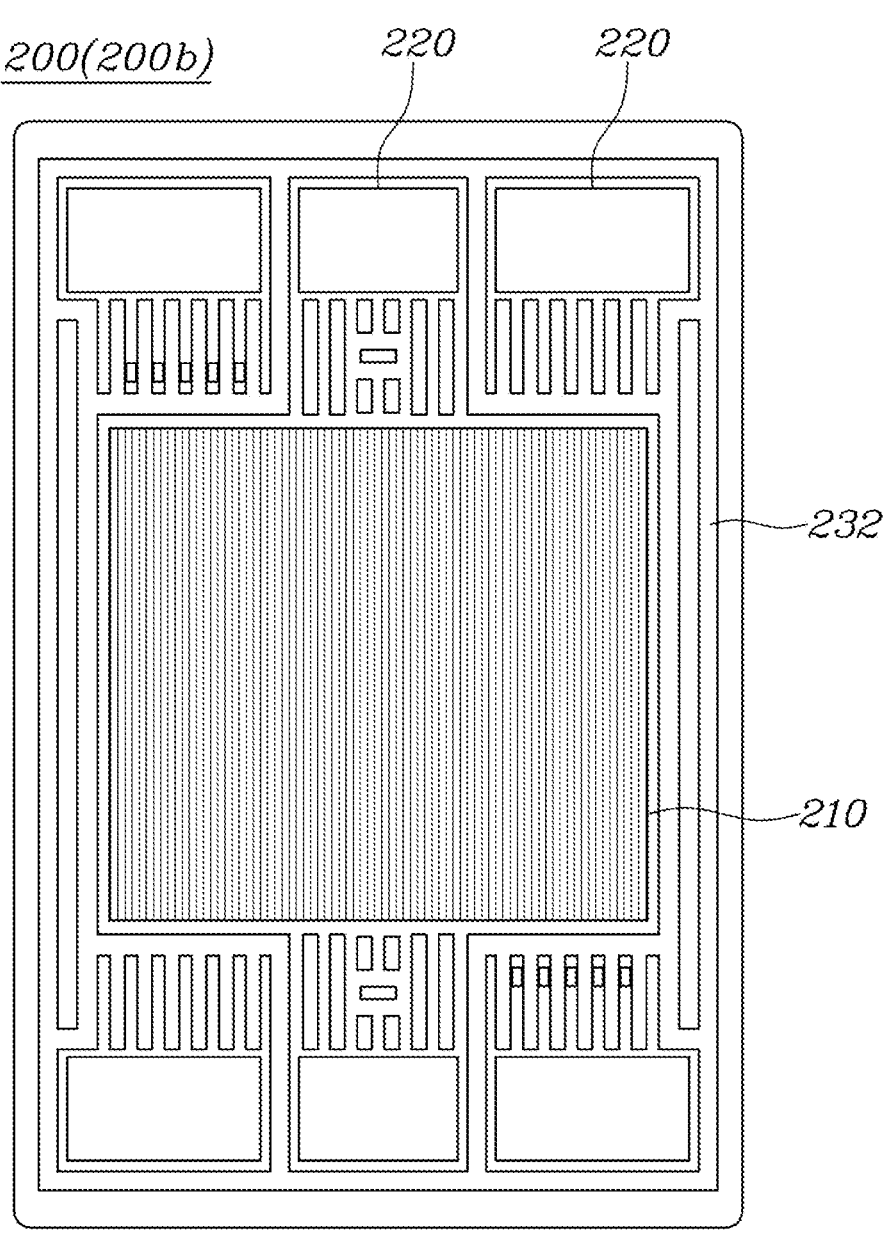
FIG. 6C is a view illustrating a second cooling surface of the second separator constituting the separator assembly for the fuel cell according to the embodiment of the present disclosure.
Figure 7A:
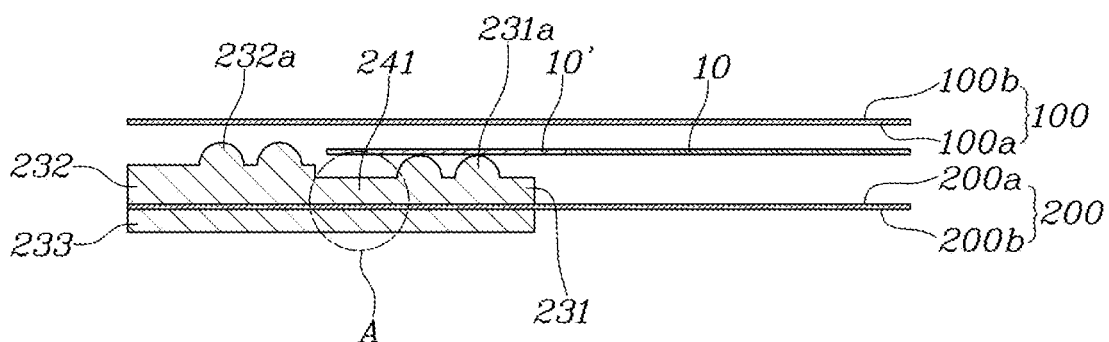
FIG. 7A is a sectional view illustrating a point where a surface pressure is strengthened when the surface pressure is formed in a unit cell constituting a fuel cell stack according to the embodiment of the present disclosure.
Figure 7B:
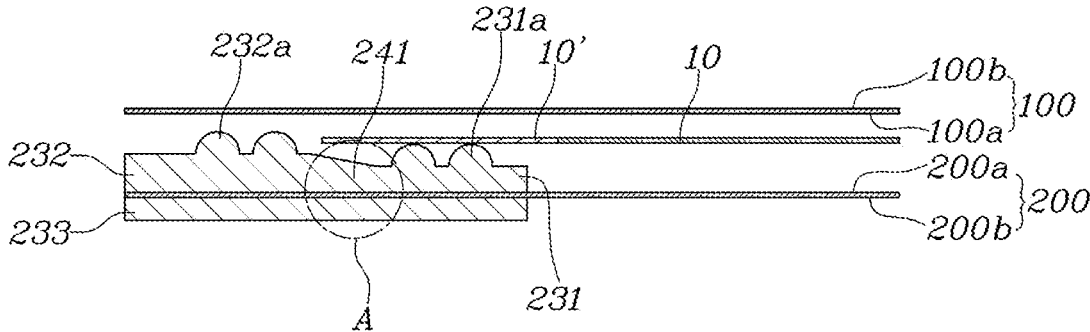
FIG. 7B is a sectional view illustrating a point where a surface pressure is strengthened when the surface pressure is formed in a unit cell constituting a fuel cell stack according to a modified example of the embodiment of the present disclosure.

FIG. 6A is a view illustrating the first separator 100 constituting a separator assembly for a fuel cell according to the embodiment of the present disclosure. FIG. 6B is a view illustrating a second reaction surface 200a of the second separator 200 constituting the separator assembly for the fuel cell according to the embodiment of the present disclosure. FIG. 6C is a view illustrating a second cooling surface 200b of to the second separator 200 constituting the separator assembly for the fuel cell according to the embodiment of the present disclosure. FIG. 7A is a sectional view illustrating a point where a surface pressure is strengthened when the surface pressure is formed in a unit cell constituting the fuel cell stack according to the embodiment of the present disclosure. FIG. 7B is a sectional view illustrating a point where a surface pressure is strengthened when the surface pressure is formed in a unit cell constituting a fuel cell stack according to a modified example of the embodiment of the present disclosure.

As illustrated in the drawings, the separator assembly for the fuel cell according to the embodiment of the present disclosure may have a configuration in which the pair of separators 100 and 200 are bonded together and are stacked on each other to face each other with the sub-gasket 10' that surrounds and supports the MEA 10 therebetween.

In detail, the separator assembly for the fuel cell according to the embodiment of the present disclosure may include the first separator 100 having a first reaction surface 100a formed on a first surface thereof and a first cooling surface 100b formed on a second surface thereof, and the second separator 200 having a second cooling surface 200b formed on a first surface thereof so as to face the first cooling surface 100b of the first separator 100 and the second reaction surface 200a formed on a second surface thereof so as to face the sub-gasket 10'.

In this case, a separate airtight line for providing an airtight seal may not be formed on the first separator 100. Whereas, airtight lines 231, 232, and 233 for providing an airtight seal are formed on the second cooling surface 200b and the second reaction surface 200a of the second separator 200 by using rubber gaskets.

Figure 2A:
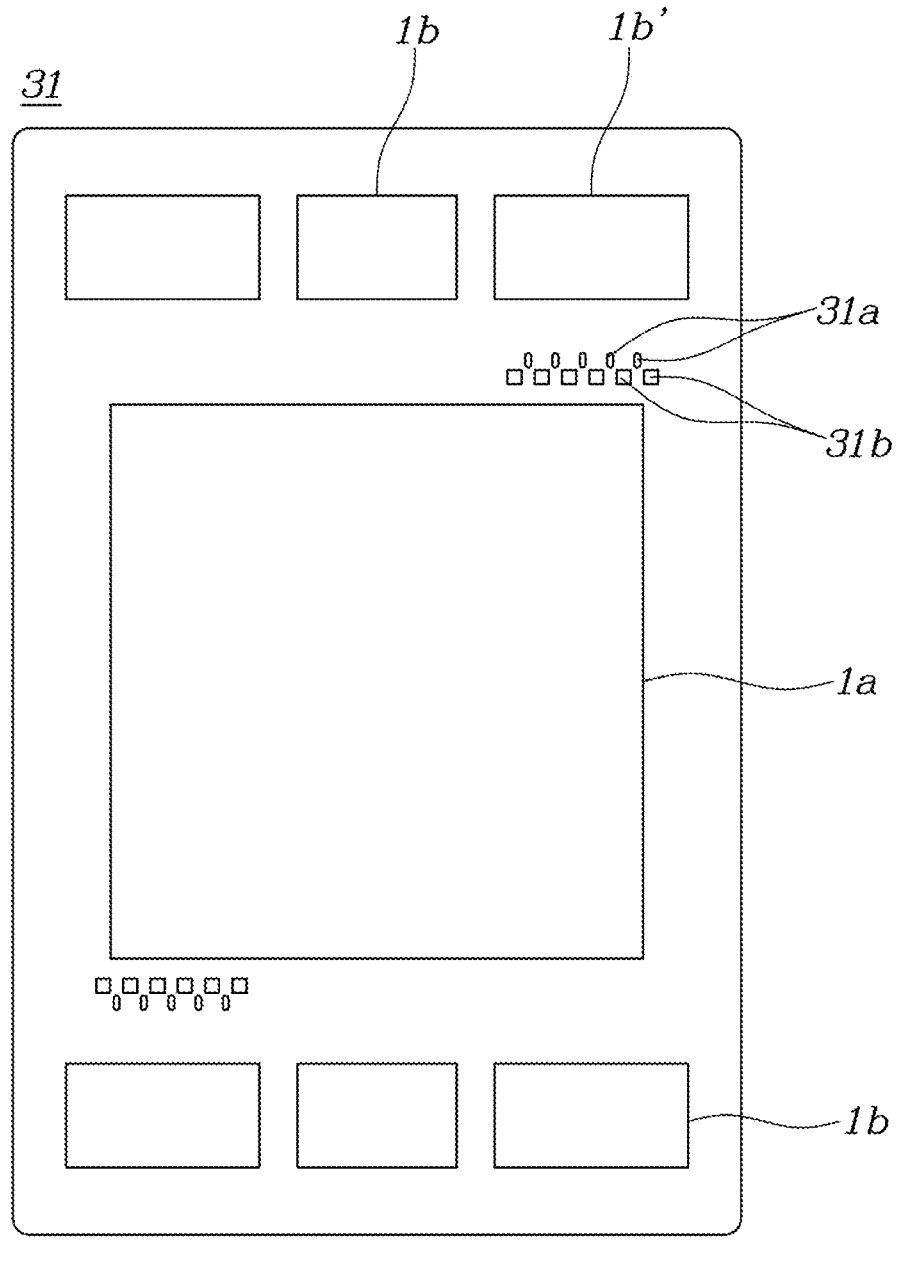
FIG. 2A is a view illustrating an anode separator constituting the typical fuel cell stack.
Figure 2B:
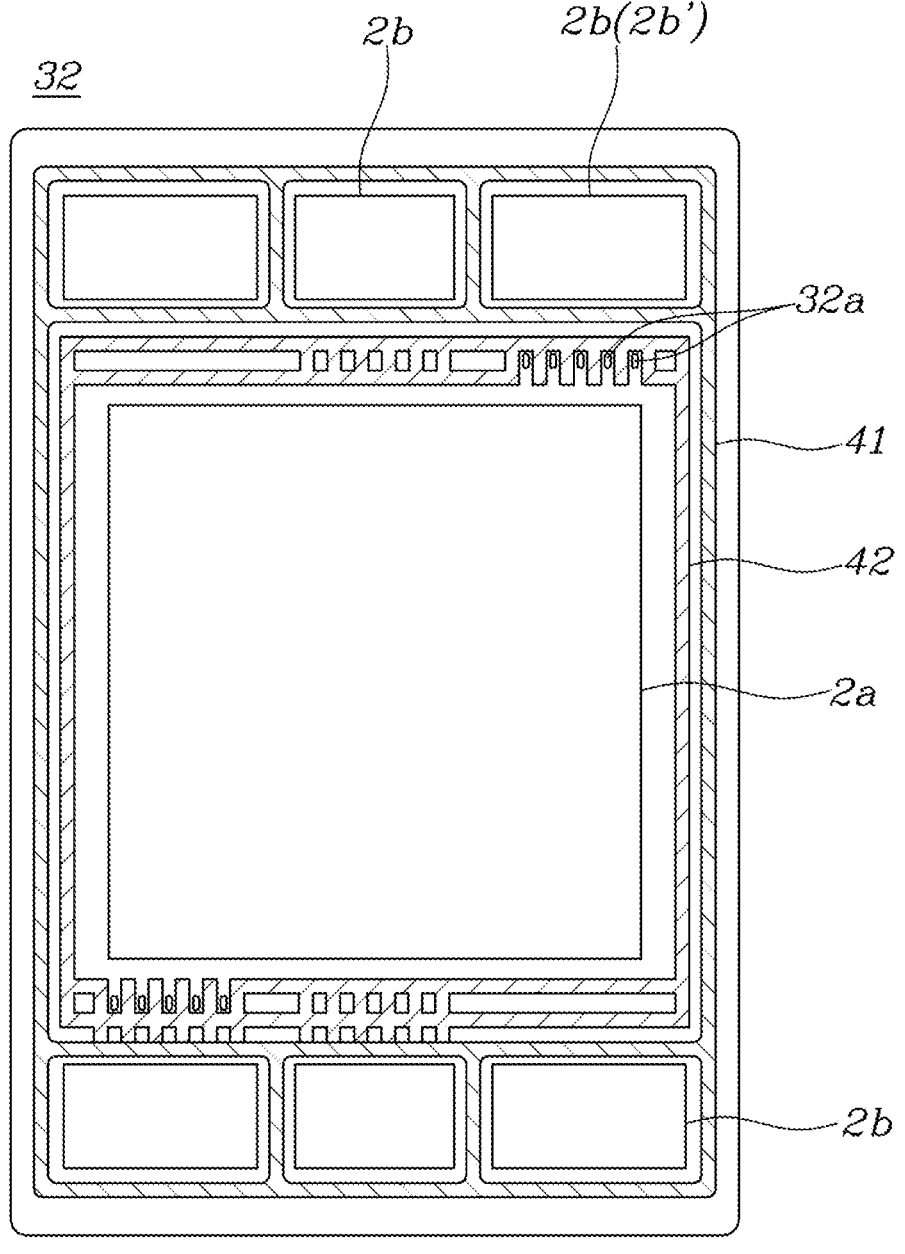
FIG. 2B is a view illustrating a cathode reaction surface of a cathode separator constituting the typical fuel cell stack.
Figure 2C:
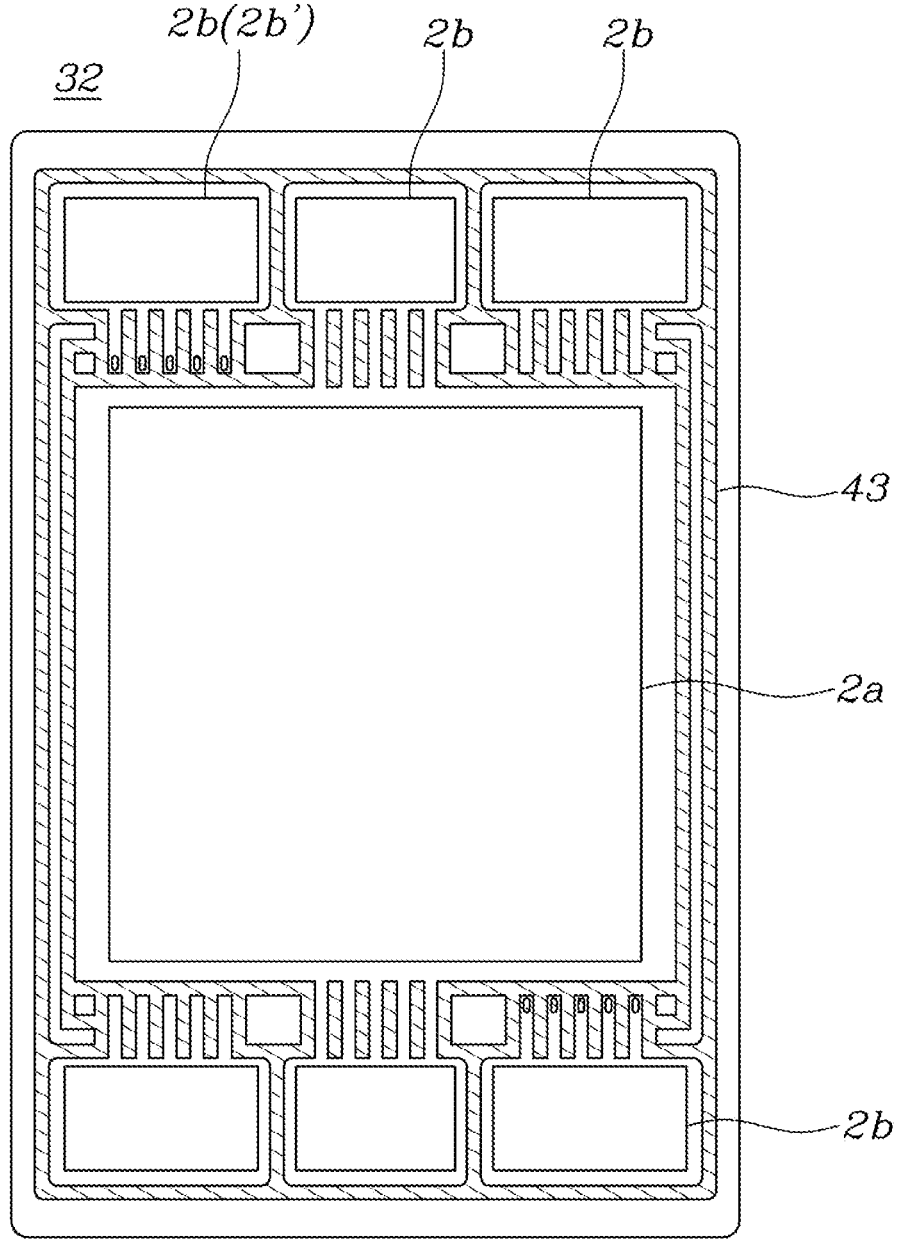
FIG. 2C is a view illustrating a cathode cooling surface of the cathode separator constituting the typical fuel cell stack.
Figure 3:
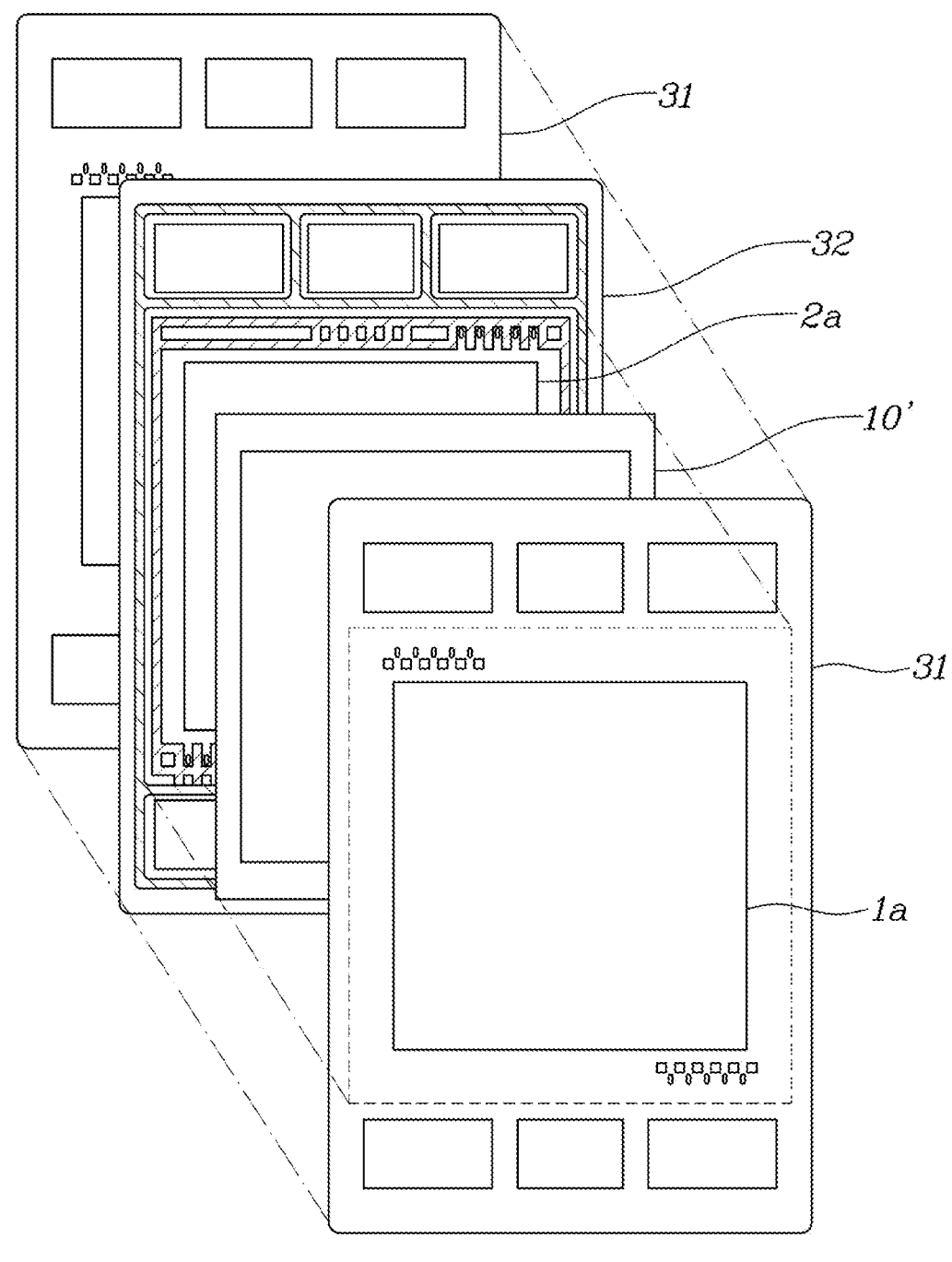
FIG. 3 is a view illustrating a unit cell constituting the typical fuel cell stack.
Figure 4:
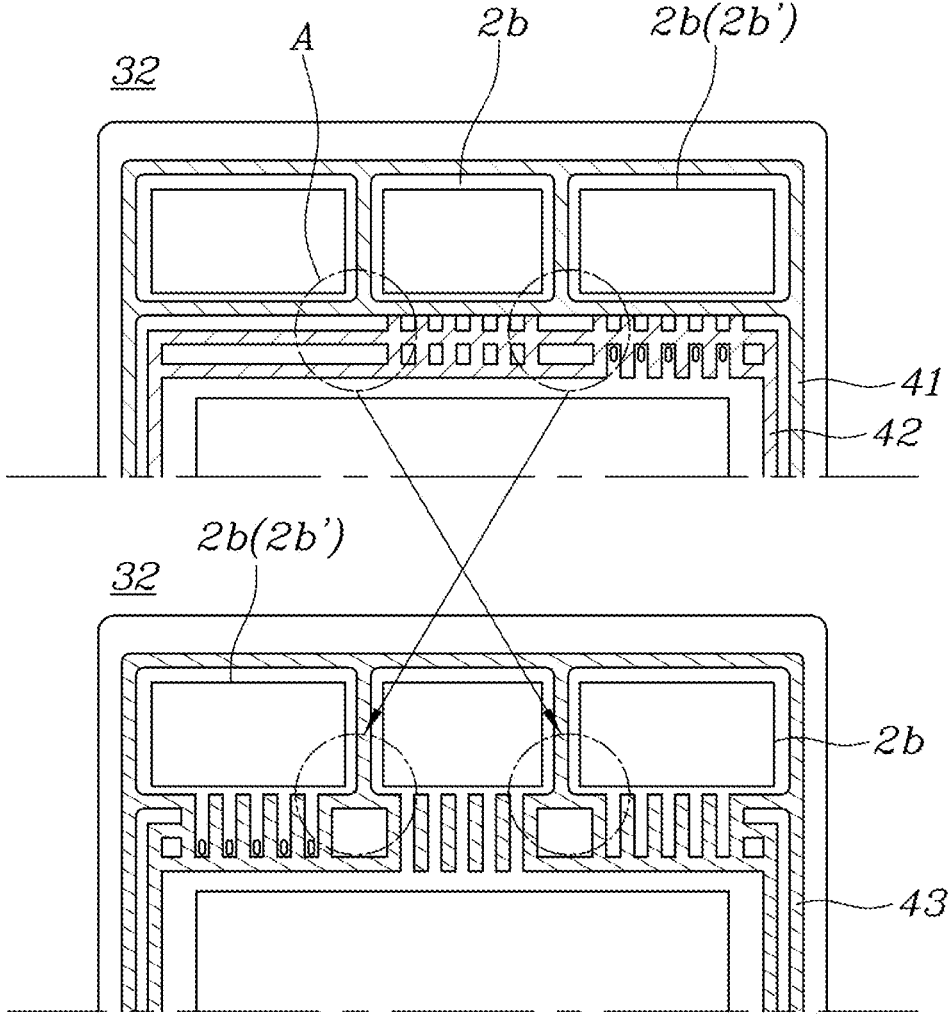
FIG. 4 is a view illustrating a point where a surface pressure is weakened when the surface pressure is formed in the cathode separator constituting the typical fuel cell stack.
Figure 5:
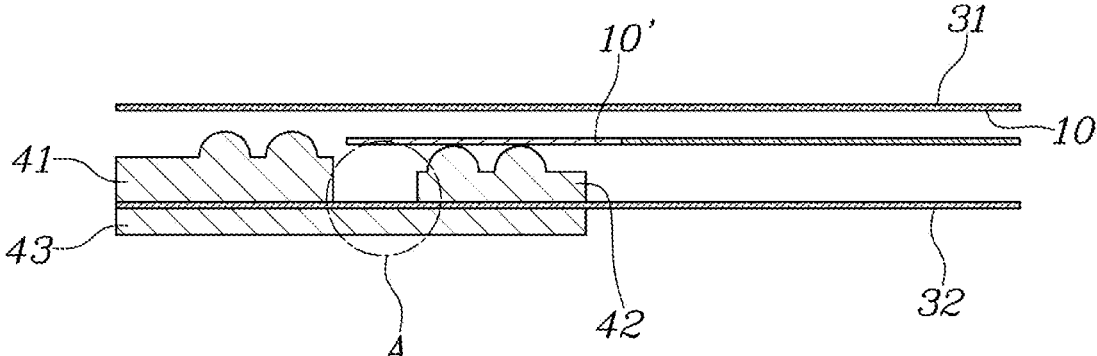
FIG. 5 is a sectional view illustrating a point where a surface pressure is weakened when the surface pressure is formed in the unit cell constituting the typical fuel cell stack.

The first separator 100 and the second separator 200 may remain the same in configuration as a conventional anode separator 31 and a conventional cathode separator 32 illustrated in FIGS. 2A to 2C.

However, a support 241, 242 may be formed on the second separator 200 serving as the cathode separator.

In detail, as illustrated in FIG. 6A, the first separator 100 serving as the anode separator may have a first reaction region 110 formed in a central region thereof and in which a flow path for flow of a first reactant gas, for example, hydrogen, is formed, and a plurality of first manifolds 120 formed at opposite sides of the first reaction region 110.

Furthermore, as illustrated in FIGS. 6B and 6C, the second separator 200 may have a second reaction region 210 formed in a region thereof corresponding to the first reaction region 110 of the first separator 100 and in which a flow path for a second reactant gas, for example, air, is formed, and a plurality of second manifolds 220 formed at opposite sides of the second reaction region 210 so as to communicate with the plurality of first manifolds 120.

As illustrated in FIG. 6B, an inner airtight line 231 for forming an airtight seal with the first separator 100 may be formed on the second reaction surface 200a of the second separator 200. The inner airtight line 231 is formed in contact with the sub-gasket 10' while surrounding the second reaction region 210.

Furthermore, an outer airtight line 232 for forming an airtight seal may be formed at the outer periphery of the second reaction surface 200a of the second separator 200. The outer airtight line 232 is formed to surround the inner airtight line 231 and the plurality of second manifolds 220. In this case, the outer airtight line 232 is formed to be in contact with the first separator 100 that is disposed to face the outer airtight line 232 with the MEA 10 and the sub-gasket 10' therebetween.

In addition, as illustrated in FIG. 6C, a cooling airtight line 233 for forming an airtight seal between the first separator 100 and the first separator 100 may be formed on the second cooling surface 200b of the second separator 200. The cooling airtight line 233 is formed to surround the second reaction region 210 and the plurality of second manifolds 220.

Meanwhile, the support 241, 242 for forming a surface pressure may be provided in various ways and numbers in a region between the inner airtight line 231 and the outer airtight line 232 of the second separator 200.

In this case, it may be preferable that the support 241, 242 is formed at a position selected from a position of the cooling airtight line 233 formed on the second cooling surface 200b of the second separator 200, and a position overlapping the position of the cooling airtight line 233 in order to form a relatively uniform surface pressure.

Therefore, it may be preferable that the support 241, 242 is formed on a virtual line L which is formed in a region between adjacent second manifolds 220 and extends from the inner airtight line 231 to the outer airtight line 232.

For example, in this embodiment, the support may be provided as a connection airtight line 241 which is formed on the second reaction surface 200a of the second separator 200 and connects the inner airtight line 231 and the outer airtight line 232 to each other.

In detail, as illustrated in FIG. 7, the connection airtight line 241 may be formed to extend from the inner airtight line 231 to be connected to the outer airtight line 232.

In this case, since the outer airtight line 232 is in contact with the first cooling surface 100b of the first separator 100 adjacent thereto and the inner airtight line 231 is in contact with the sub-gasket 10', the outer airtight line 232 may be formed to have a height higher than that of the inner airtight line 231.

Therefore, it may be preferable that the connection airtight line 241 is formed to have a height equal to or higher than that of the inner airtight line 231. Furthermore, it is preferable that the connection airtight line 241 is formed to have a height equal to or lower than that of the outer airtight line 232.

More precisely, an outer protrusion 232a and an inner protrusion 231a may be formed on the outer airtight line 232 and the inner airtight line 231, respectively, for a more reliable airtight seal with corresponding configurations. In this case, it is preferable that the connection airtight line 241 is formed to have a height equal to or higher than a height except for the height of the inner protrusion 231a of the inner airtight line 231 and is formed to have a height equal to or lower than a height except for the height of the outer protrusion 232a of the outer airtight line 232.

For example, as illustrated in FIG. 7A, the connection airtight line 241 may be formed to have a height equal to a height except for the height of the inner protrusion 231a of the inner airtight line 231.

In this case, an edge of the sub-gasket 10' may not be particularly limited in position as long as it extends to a point where the inner protrusion 231a formed on the inner airtight line 231 is located.

Meanwhile, FIG. 7B is a sectional view illustrating the point where the surface pressure is strengthened when the surface pressure is formed in the unit cell constituting the fuel cell stack according to the modified example of the embodiment of the present disclosure. As illustrated in FIG. 7b, the connection airtight line 241 may be inclined so that the height thereof gradually increases from a point connected to the inner airtight line 231 to a point connected to the outer airtight line 232.

On the other hand, the support may be implemented in a form different from the connection airtight line 241.

Figure 8A:
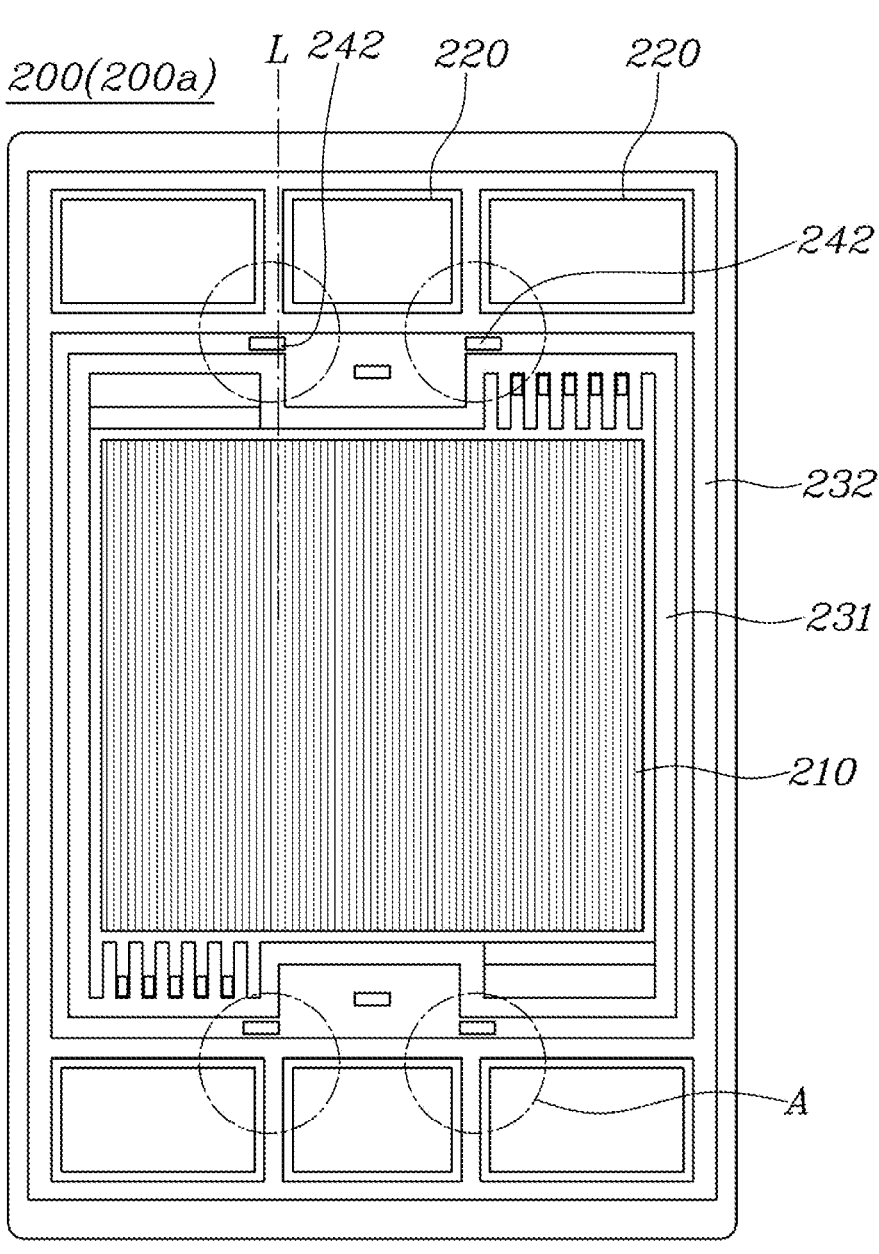
FIG. 8A is a view illustrating a second reaction surface of a second separator constituting a separator assembly for a fuel cell according to another embodiment of the present disclosure.
Figure 8B:
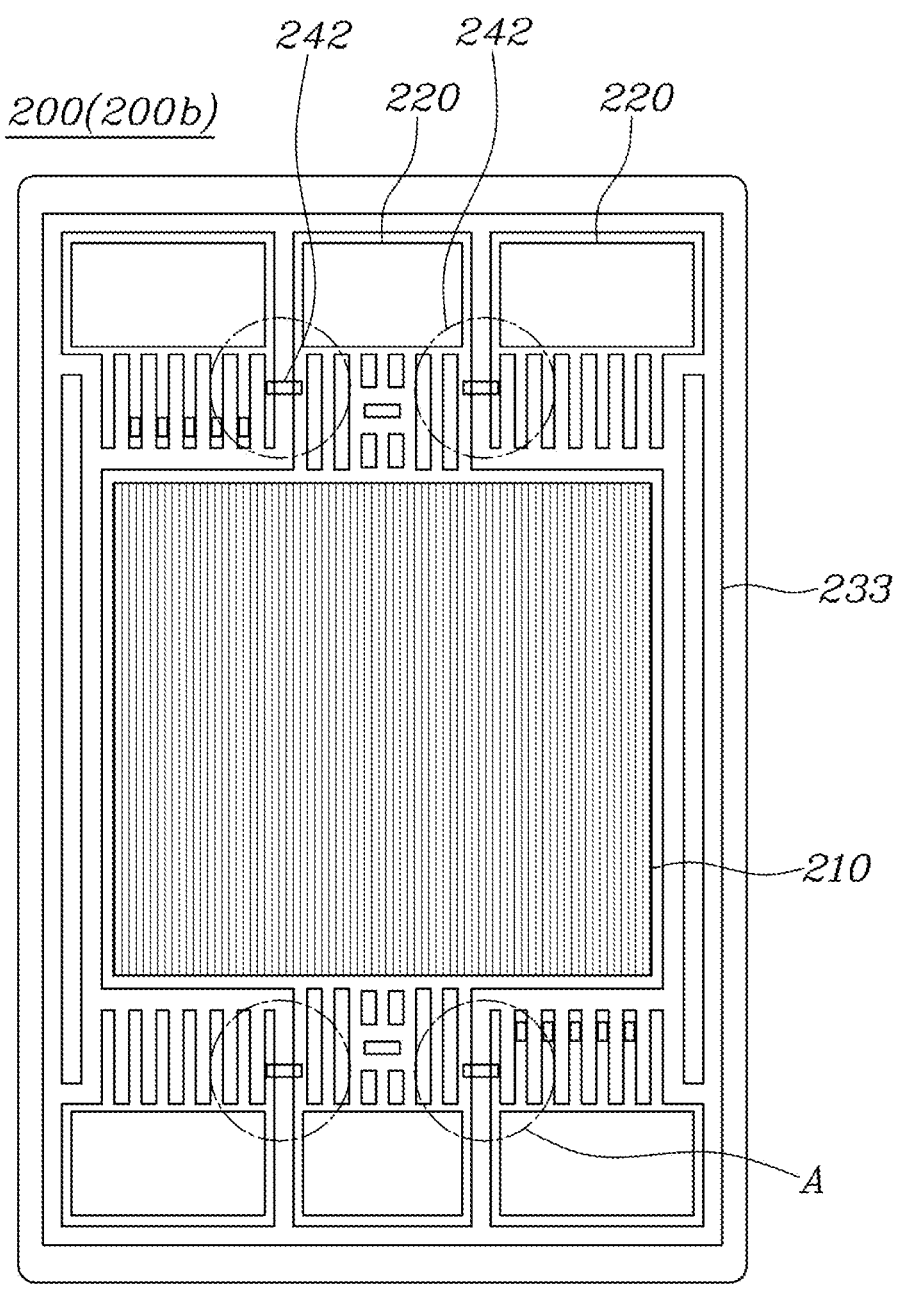
FIG. 8B is a view illustrating a second cooling surface of the second separator constituting the separator assembly for the fuel cell according to the other embodiment of the present disclosure.
Figure 9A:
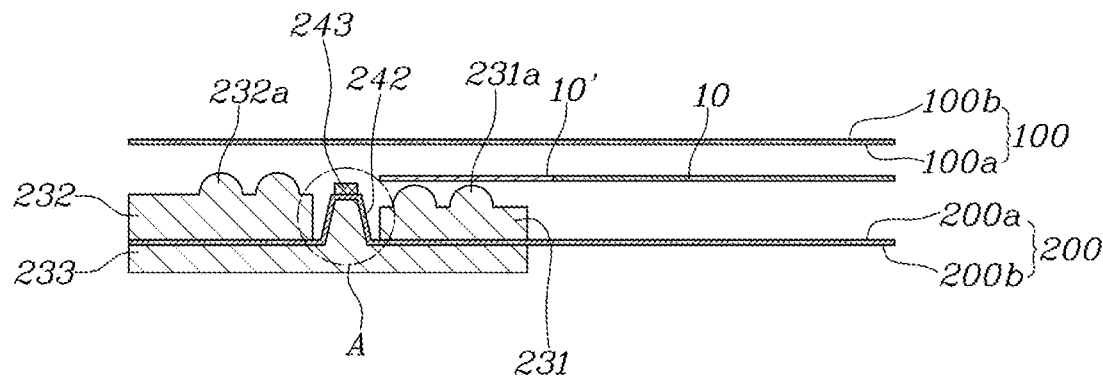
FIG. 9A is a sectional view illustrating a point where a surface pressure is strengthened when the surface pressure is formed in a unit cell constituting a fuel cell stack according to the other embodiment of the present disclosure.

FIG. 8A is a view illustrating a second reaction surface 200a of a second separator 200 constituting a separator assembly for a fuel cell according to another embodiment of the present disclosure. FIG. 8B is a view illustrating a second cooling surface 200b of the second separator constituting the separator assembly for the fuel cell according to the other embodiment of the present disclosure. FIG. 9A is a sectional view illustrating a point where a surface pressure is strengthened when the surface pressure is formed in a unit cell constituting a fuel cell stack according to the other embodiment of the present disclosure.

As illustrated in FIGS. 8A, 8B, and 9A, a support may be implemented by improving the shape of the second separator 200.

For example, the support may be implemented as a forming protrusion 242 which is formed on the second separator so as to protrude toward the second reaction surface 200a in a region between an inner airtight line 231 and an outer airtight line 232.

In this case, it may be preferable that the forming protrusion 242 is formed at the same position as the position where the above-described connection airtight line 241 is formed, and the forming protrusion 242 is formed to have a height equal to or higher than that of the inner airtight line 231 as in the case of the connection airtight line 241. Furthermore, it is preferable that the forming protrusion 242 is formed to have a height equal to or lower than that of the outer airtight line 232.

Meanwhile, since the forming protrusion 242 is a configuration formed by forming and protruding a portion of the second separator 200 having conductivity formed and protruded, there may be a possibility of the occurrence of a short-circuit when the forming protrusion 242 comes into contact with a first separator 100 adjacent thereto. Therefore, as illustrated in FIG. 9A, it is important to prevent direct contact of the forming protrusion 242 with the first separator 100 by extending an edge of a sub-gasket 10' to above top of the forming protrusion 242 so that the sub-gasket 10' is positioned between the forming protrusion 242 and the second separator 200.

In this case, it may be preferable that a cooling airtight line 233 formed on the second cooling surface 200b is formed by filling an inner space of the forming protrusion 242 formed on the second cooling surface 200b. Precisely, a rubber gasket that forms the cooling airtight line 233 fills the inner space of the forming protrusion 242. Therefore, it is possible to increase a surface pressure strengthening effect by the forming protrusion 242.

Figure 9B:
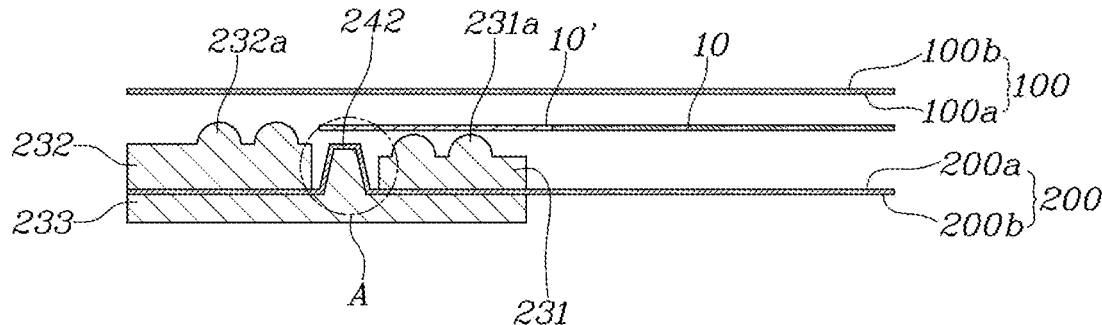
FIG. 9B is a sectional view illustrating a point where a surface pressure is strengthened when the surface pressure is formed in a unit cell constituting a fuel cell stack according to a modified example of the other embodiment of the present disclosure.

Meanwhile, FIG. 9B is a sectional view illustrating a point where a surface pressure is strengthened when the surface pressure is formed in a unit cell constituting a fuel cell stack according to a modified example of the other embodiment of the present disclosure. As illustrated in FIG. 9B, when an edge of a sub-gasket 10' extends only to an inner airtight line 231, an insulating layer 243 may be further formed in an upper end region where a forming protrusion 242 protrudes so that a short-circuit does not occur even if the forming protrusion 242 comes into direct contact with a first separator 100.

In this case, the insulating layer 243 may be made of various types of insulating material, but is preferably made of the same material as the inner airtight line 231 or an outer airtight line 232.

In this case, it is also preferable that a cooling airtight line 233 formed on a second cooling surface 200b is formed by filling an inner space of the forming protrusion 242 formed on the second cooling surface 200b.

Although a preferred embodiment of the present disclosure has been described for illustrative purposes, those skilled in the art will appreciate that various modifications, additions, and substitutions are possible, without departing from the scope and spirit of the disclosure as disclosed in the accompanying claims. Therefore, the scope of the present disclosure should be determined on the basis of the descriptions in the accompanying claims, and all equivalents thereof should belong to the scope of the present disclosure.

What is claimed is:

1. A separator assembly for a fuel cell, the separator assembly being configured such that a pair of separators are bonded together and are stacked on each other while facing each other with a sub-gasket that surrounds and supports a membrane electrode assembly therebetween, and the separator assembly comprising:
   a first separator comprising:
      a first reaction surface formed on a first surface thereof, and
      a first cooling surface formed on a second surface thereof; and a second separator comprising:
      a second cooling surface formed on a first surface thereof so as to face the first cooling surface of the first separator,
      a second reaction surface formed on a second surface thereof so as to face the sub-gasket,
      a cooling airtight line formed on the second cooling surface and configured to form an airtight seal with the first separator,
      an inner airtight line formed on the second reaction surface and configured to form an airtight seal with the sub-gasket, and
      an outer airtight line formed on an outer periphery of the second reaction surface and configured to form an airtight seal,
   wherein at least one support configured to form a surface pressure is provided in a region between the inner airtight line and the outer airtight line of the second separator.

2. The separator assembly of claim 1, wherein the support is formed at a position overlapping a position where the cooling airtight line is formed.

3. The separator assembly of claim 2, wherein the first separator further comprises a first reaction region formed in a central region thereof and in which a flow path for flow of a first reactant gas is formed and a plurality of first manifolds formed at opposite sides of the first reaction region, and
   the second separator further comprises a second reaction region formed in a region thereof corresponding to the first reaction region of the first separator and in which a flow path for a second reactant gas is formed, and a plurality of second manifolds formed at opposite sides of the second reaction region so as to communicate with the plurality of first manifolds,
   wherein the inner airtight line is formed on the second reaction surface so as to be in contact with the sub-gasket while surrounding the second reaction region, the outer airtight line is formed to surround the inner airtight line and the plurality of second manifolds, and the cooling airtight line is formed on the second cooling surface so as to surround the second reaction region and the plurality of second manifolds.

4. The separator assembly of claim 3, wherein the support is formed on a virtual line which is formed in a region between adjacent second manifolds and extends from the inner airtight line to the outer airtight line.

5. The separator assembly of claim 1, wherein the support is a connection airtight line which is formed on the second reaction surface of the second separator and connects the inner airtight line and the outer airtight line to each other.

6. The separator assembly of claim 5, wherein the outer airtight line is formed to have a height higher than a height of the inner airtight line, and
   the connection airtight line is formed to have a height equal to or higher than a height of the inner airtight line and is formed to have a height equal to or lower than a height of the outer airtight line.

7. The separator assembly of claim 5, wherein the outer airtight line is formed to have a height higher than a height of the inner airtight line, and
   the connection airtight line is inclined so that a height thereof gradually increases from a point connected to the inner airtight line to a point connected to the outer airtight line.

8. The separator assembly of claim 1, wherein the support is a forming protrusion which is formed on the second separator so as to protrude toward the second reaction surface in the region between the inner airtight line and the outer airtight line.

9. The separator assembly of claim 8, wherein the cooling airtight line fills an inner space of the forming protrusion formed on the second cooling surface.

10. The separator assembly of claim 8, wherein the outer airtight line is formed to have a height higher than a height of the inner airtight line, and the forming protrusion is formed to have a height equal to or higher than a height of the inner airtight line and is formed to have a height equal to or lower than a height of the outer airtight line.

11. The separator assembly of claim 8, wherein the sub-gasket comprises an edge extending to above top of the forming protrusion.

12. The separator assembly of claim 8, wherein the sub-gasket comprises an edge extending to above top of the inner airtight line, and an insulating layer is formed in an upper end region of the second cooling surface where the forming protrusion protrudes.

13. The separator assembly of claim 12, wherein the insulating layer is made of the same material as the inner airtight line or the outer airtight line.

14. The separator assembly of claim 1, wherein a separate airtight line configured to provide an airtight seal is not formed on the first separator.

15. A fuel cell stack formed by stacking a plurality of unit cells each of which comprises a membrane electrode assembly, a sub-gasket surrounding and supporting the membrane electrode assembly, a pair of gas diffusion layers, and a pair of first and second separators, wherein the first separator and the second separator of adjacent unit cells disposed to face each other are stacked on each other, the first separator comprising:

a first reaction surface formed on a first surface thereof, and a first cooling surface formed on a second surface thereof; and the second separator comprising:

a second cooling surface formed on a first surface thereof so as to face the first cooling surface of the first separator and a second reaction surface formed on a second surface thereof so as to face the sub-gasket, a cooling airtight line formed on the second cooling surface and configured to form an airtight seal with the first separator, an inner airtight line formed on the second reaction surface and configured to form an airtight seal with the sub-gasket, an outer airtight line formed on an outer periphery of the second reaction surface and configured to form an airtight seal, and wherein at least one support configured to form a surface pressure is provided in a region between the inner airtight line and the outer airtight line of the second separator.

16. The fuel cell stack of claim 15, wherein the support is a connection airtight line which is formed on the second reaction surface of the second separator and connects the inner airtight line and the outer airtight line to each other.

17. The fuel cell stack of claim 15, wherein the support is a forming protrusion which is formed on the second separator so as to protrude toward the second reaction surface in the region between the inner airtight line and the outer airtight line.

18. The fuel cell stack of claim 17, wherein the cooling airtight line fills an inner space of the forming protrusion formed on the second cooling surface.

19. The fuel cell stack of claim 15, wherein a separate airtight line configured to provide an airtight seal is not formed on the first separator.

20. The fuel cell stack of claim 15, wherein the first separator is an anode separator, and the second separator is a cathode separator.

* * * * *